Patented Mar. 3, 1942

2,274,751

UNITED STATES PATENT OFFICE 2,274,751

COLORATION OF TEXTILE AND OTHER MATERIALS

Percy Frederick Combe Sowter and William Salkeld Meals, Spondon, near Derby, England, assignors to Celanese Corporation of America, a corporation of Delaware No Drawing. Application September 17, 1938, Serial No. 230,390. In Great Britain October 22, 1937

6 Claims. (Cl. 8—59)

This invention relates to the coloration of textile and other materials made from cellulose acetate or other cellulose ester or ether.

U. S. Patent No. 1,927,145 describes the coloration of cellulose ester or ether filaments, yarns or the like by applying to the running materials a solution of a coloring matter in an organic solvent. The use of solutions of coloring matters in organic solvents for the coloration of running yarns has the merit that the coloring operation can be carried out at very high thread speeds, provided that a sufficiently volatile solvent is employed. For example, it is possible to effect the coloring operation at a yarn speed of 60 yarns a minute without the drying time being so long as to call for an impracticably long run of the yarn in the drying device necessarily employed. However, the use of highly volatile solvents sometimes leads to shades which are not of very good fastness to rubbing, particularly when deep shades are being produced.

We have found that when coloring running yarns especially good results as regards production of uniform colorations of good fastness to rubbing can be obtained if the dyestuff is applied in solution in a mixture of an organic liquid of low boiling point, particularly below 90° C., with a higher boiling liquid which is a solvent for the dyestuff. Using such a solvent mixture it is possible to obtain very rapid drying of the yarns after application of or immersion in the solution of the coloring matter without the dyeings lacking the fastness to rubbing which is frequently experienced when attempts are made to dye textile yarns with simple solutions of dyestuffs in highly volatile organic liquids.

The low boiling organic liquid employed is preferably one having a swelling action on the cellulose ester or ether material of the yarns and may be a single organic substance or a mixture of organic substances. It may consist of or comprise a carboxylic ester, for example ethyl acetate, ethyl formate and methyl acetate, an alcohol, for example methyl alcohol, ethyl alcohol and isopropyl alcohol, a hydrocarbon, for example aliphatic hydrocarbons and benzene, or a halogenated aliphatic hydrocarbon, for example dichlorethylene, trichlorethylene, and ethylene dichloride. The swelling power for the material which is desirable may be ensured by a suitable choice of liquid or liquids, and/or by adjustment of the proportions of the components where a mixture is employed.

Particularly useful as the low boiling portion of the dye liquid is a mixture of a volatile ester, particularly ethyl acetate, with a volatile alcohol, particularly ethyl alcohol. Conveniently a mixture of 40 parts of ethyl acetate with 45 parts of ethyl alcohol is employed.

As mentioned above the liquid of higher boiling point employed is one which is a solvent for the dyestuff. Preferably it is not a solvent or strong swelling agent for the cellulose acetate or other material of the threads to be colored. It is preferable that the boiling point of the higher boiling liquid portion of the dye liquid should be above about 120° C. and preferably between about 130 and 170° C., and particularly between 130 and 150° C. The invention is, however, not restricted to the use of liquids of these particular boiling points, since liquids of higher or lower boiling point, e. g. up to 180° C., may be employed.

As the higher boiling constituent halogenated aromatic hydrocarbons have been found especially useful, particularly monochlorbenzene; other halogen benzenes may, however, be employed, e. g. a mono-chlortoluene or ortho-dichlorbenzene. Again the higher boiling constituent of the dye liquid may be an ester, for example amyl acetate, amyl butyrate, glycol monoacetate, glycol diacetate, glycol mono-methyl or ethyl ether-acetate, cyclohexyl acetate, methyl cyclohexyl acetate or ethyl lactate, an ether, for example glycol monoethyl ether, or an alcohol, for example thiodiglycol, diethylene glycol, cyclohexanol, methyl cyclohexanol and other hydroaromatic alcohols. Mixtures of two or more of the above or other substances may be used if desired.

The proportion of higher boiling liquid in the dye liquid may vary within fairly wide limits. For example it may comprise from 10 to 45% or more of the total dye liquid, and especially 30 to 40%. A particularly useful mixture for the coloration of running cellulose acetate yarn is one consisting of 50 parts by volume of monochlorbenzene, 45 parts of ethyl alcohol and 40 parts of ethyl acetate.

The dye liquids employed according to the invention are essentially organic in character, though the presence of some water, e. g. up to 5 or 10%, is not excluded.

The application of the dye liquids to the running yarns can be effected in various ways, and especially by passing the thread through a bath of the dye liquid. After passage through the dye liquid any liquid carried by the threads in excess of that required to give the desired shade may be removed in any convenient way, for example by passing the yarns between a pair of squeezing rolls. The time of immersion in the dyebath may be very short, for example of the order of one second in the case of the mixture of chlorbenzene, ethyl alcohol and ethyl acetate mentioned above. After passing through the dyebath the yarns may be dried immediately. If desired, however, particularly when heavy shades are being produced, the yarns may be given a wash with an organic liquid which is a solvent for the dyestuff, for example a wash with a solvent mixture such as that employed in the preparation of the dye liquid itself.

Other methods of applying the dye liquid to the running thread may be employed if desired. For example the running yarn may be sprayed with the dye liquid.

The concentration of the dye in the dye liquid may be of the order of 0.1 to 1% according to the depth of color required.

The invention is not restricted to the coloration of cellulose ester or ether yarns, since foils, straws and analogous materials, or textile fabrics, may be colored similarly. In the case of fabrics, for instance, they may be colored by padding with the dye solution on a padding mangle, and drying.

The dye liquids of the invention are in general of value for the coloring of cellulose ester or ether textiles or other materials by processes involving mechanical impregnation of the material with the dye liquid (i. e. the impregnation of the material with a sufficient quantity of dye liquid to impart the desired color followed by drying.

A wide range of dyestuffs may be applied in solution in accordance with the present invention, particularly water-insoluble dyestuffs of the kind extensively employed for the dyeing of cellulose acetate from aqueous dispersions. Such dyestuffs may be, for example, water-insoluble azo dyes (e. g. 4-nitro-2-methoxybenzene-azo-dimethylaniline), water-insoluble nitro-diaryl-amine dyes (e. g. 2:4-dinitro-4'-amino-diphenylamine), water-insoluble indigoid dyes, and water-insoluble dyes of the amino-anthraquinone series, for example 1.4-diaminoanthraquinone, 1-amino-4-oxyanthraquinone, 1:4-di-(methylamino)-anthraquinone and 1:4-di-(ethanolamino)-anthraquinone. Water-soluble dyes having affinity for cellulose esters and ethers, e. g. 1-amino-4-phenylamino-anthraquinone-2-sulphonic acid, can, however, be applied by the new process.

Again, instead of applying a dyestuff in the organic liquid mixture a dye component may be applied therein, and a dyestuff formed from it on the materials. For example azo dye components, whether diazo components or coupling components, can be applied and coupling effected on the material. A convenient method of working is to apply both a diazo component and a coupling component together from the organic liquid mixture and then to effect diazotisation and coupling, e. g. by treatment first with nitrous acid and then with alkali. This latter method is very useful when enolic coupling compenents are applied, e. g. arylamides of 2:3-oxynaphthoic acid or of other o-hydroxyaryl carboxylic acids and diacylacetyl derivatives of aromatic diamines such as diacetoacetyl-ortho-tolidine. Further, leuco compounds of vat dyes, whether as salts or in the free state, or acid sulphuric or other esters of leuco compounds of vat dyes, advantageously in the form of salts with organic bases, may thus be applied and then converted into the parent vat dyestuffs on the materials.

When applying the esters of leuco compounds of vat dyes cyclohexanol is useful as the liquid component of high boiling point. It can be used in the proportion of about 2–10% on the total liquid. The ester of the leuco compound is advantageously pasted with the cyclohexanol and then mixed with the volatile organic liquid. The hydrolysis and oxidation requisite to convert the ester of the leuco vat dye to the parent vat dye can be effected by means of an acidified nitrite solution or an acidified chromate solution.

The new process is of special interest for the coloration of cellulose acetate materials. It may, however, be applied to the coloring of filaments, yarns, foils, straws and the like made from other cellulose esters or ethers, for example cellulose formate, propionate or butyrate, or ethyl, methyl or benzyl cellulose. The materials may have been made by stretching formed filaments, yarns, foils, films and similar materials either after softening with an organic softening agent or in the presence of steam or hot water. Again the materials may be of cellulose which has been esterified, etherified, or both esterified and etherified, to a high degree, e. g. cellulose esters having an acidyl value approaching that of a tri-ester. Examples of such products are those made by esterifying formed filaments, yarns, foils, films and similar materials having a basis of organic derivatives of cellulose, for instance in the manner described in U. S. applications S. Nos. 39,288, 39,289 and 39,290, all dated September 5, 1935.

Having described our invention, what we desire to secure by Letters Patent is:

1. Process for the coloration of cellulose acetate textile materials, which comprises mechanically impregnating the material with a solution of a water-insoluble dye, which has an affinity for the cellulose acetate when applied from an aqueous dispersion, in a mixture of an organic liquid having a swelling action on the cellulose acetate and boiling below 90° C. with monochlorbenzene which constitutes from 10 to 45% of the total dye liquid, and thereafter drying the material.

2. Process for the coloration of cellulose acetate yarns, which comprises running them through a solution of a water-insoluble dye, which has an affinity for the cellulose acetate when applied from an aqueous dispersion, in a mixture of an organic liquid having a swelling action on the cellulose acetate and boiling below 90° C. with monochlorbenzene which constitutes from 10 to 45% of the total dye liquid, and thereafter drying the yarns.

3. Process for the coloration of cellulose acetate textile materials, which comprises mechanically impregnating the material with a solution of a water-insoluble dye, which has an affinity for the cellulose acetate when applied from an aqueous dispersion, in a mixture of ethyl alcohol, ethyl acetate and monochlorbenzene which constitutes from 10 to 45% of the total dye liquid, and thereafter drying the material.

4. Process for the coloration of cellulose acetate yarns, which comprises running them through a solution of a water-insoluble dye, which has an affinity for the cellulose acetate when applied from an aqueous dispersion, in a mixture of ethyl alcohol, ethyl acetate and monochlorbenzene which constitutes from 10 to 45% of the total dye liquid, and thereafter drying the yarns.

5. Process for the coloration of cellulose acetate yarns, which comprises running them through a solution of a water-insoluble dye, which has an affinity for the cellulose acetate when applied from an aqueous dispersion, in a mixture of ethyl acetate, ethyl alcohol and monochlorbenzene, the latter constituting from 30 to 40% of the liquid, and thereafter drying the yarns.

6. Process for the coloration of cellulose acetate yarns, which comprises running them through a solution of a water-insoluble dye, which has an affinity for the cellulose acetate when applied from an aqueous dispersion, in an organic liquid medium comprising about 50 parts by volume of monochlorbenzene, about 45 parts by volume of ethyl alcohol and about 40 parts by volume of ethyl acetate, and thereafter drying the yarns.

PERCY FREDERICK COMBE SOWTER.
WILLIAM SALKELD MEALS.